3,222,719
EXTRUSION APPARATUS
Paul H. Wagner, Borger, Tex., and Edward J. Kosinsky, Bartlesville, Okla., assignors to Phillips Petroleum Company, a corporation of Delaware
Filed July 27, 1962, Ser. No. 212,821
1 Claim. (Cl. 18—12)

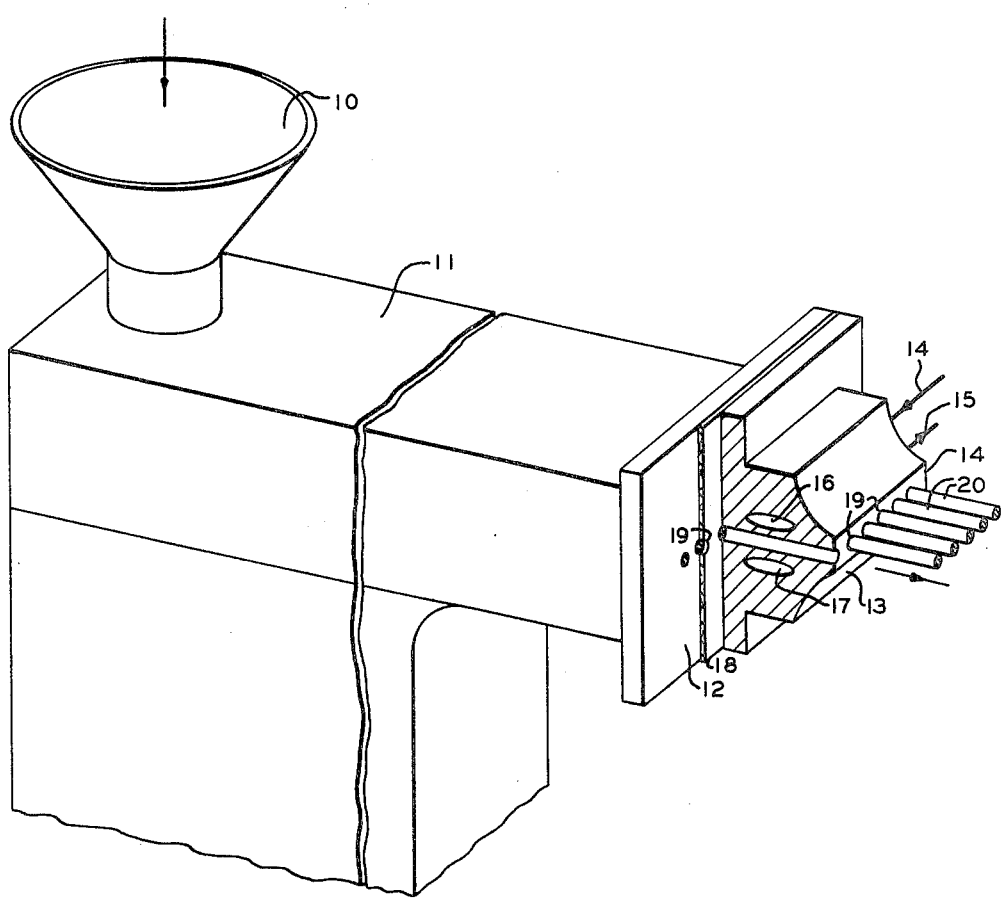

This invention relates to apparatus for stranding of polyolefins. More particularly, this invention relates to a method of and apparatus for preventing "collar" formation in the stranding of polyolefins by preventing the buildup of polymer on the die face. In one aspect this invention relates to an improved thermoplastic stranding apparatus having a modified die therein which prevents "collaring" of the strands. In another aspect this invention relates to an improved method for forming thermoplastic strands by establishing a linear heat gradient along the strands being extruded through the die orifices and thereby controlling the temperature so as to prevent fouling of the die face.

In the forming of thermoplastic strands, the semi-molten resin strands emerging from the holes in the dies tend to cling to the edges of the holes on one side or another and to work their way up against the face of the die so that eventually the die becomes fouled. This phenomenon is known as "collaring" or "die-facing." This fouling of the die face cuts down on production and spoils the strands by periodically breaking off from the face of the die and becoming entangled in the strands. In addition, some discoloring of the strands occurs due to thermal degradation. Various means have been proposed to prevent this die-facing phenomenon. For instance, it has been proposed to provide a shielded enclosure about the die and to keep this flushed at all times with an inert gas, it being thought that the die-facing was partially due to oxidation of emerging strands. Likewise, it has been proposed to make the die of special materials or to coat the die with special materials, such as polytetrafluoroethylene, silicones, and the like. These devices either have not proven very successful or have not been practical to operate.

We have now found that polymer buildup on the extrusion die surface is prevented by attaching a controlled temperature strand plate to the die face. The plate is cored so as to allow a controlled flow of fluid through same so as to maintain a predetermined temperature in the area around the extrusion orifices and thus establish a linear heat gradient through same. A suitable solid insulator can be placed between the die and the strand plate to serve as a thermal barrier.

Thus it is an object of this invention to provide a novel means for preventing die-facing in the formation of thermoplastic strands.

Another object of this invention is to provide apparatus for reducing the shearing forces in the thermoplastic strands so as to avoid fouling of the strands by the separation of small amounts of the material from the extrudate.

Another object of this invention is to provide a temperature controlled strand plate for use in extruding thermoplastic strands.

Other objects, aspects, and the several advantages of this invention will become apparent from the following disclosure, drawing, and the appended claims.

The accompanying drawing is a view showing an example of an extrusion apparatus for carrying out the present invention. The plastic is placed in feed hopper 10 and then fed into extrusion chamber 11. The extrusion chamber is provided with means for maintaining proper operating temperature within same. Attached to die face 12 is a temperature controlled strand plate 13. Conduits 14 and 15 are provided to allow introduction and removal of fluid such as cooled heat transfer oil in cores 16 and 17. Suitable insulation 18 is placed between the hot die face 12 and the strand plate 13. This serves to reduce the burden on coolant being introduced to the strand plate. The die face 12 is provided with a plurality of orifices 19 through which the desired strands are formed. The insulation 18 and strand plate 13 are provided with corresponding holes through same which are of the same or longer dimensions and so aligned with these orifices that the formed strands pass unobstructed through same. The strands 20 emerging from die plate 13 are free from any foreign matter and are suitable for any desired subsequent treatment.

The following example will serve to further illustrate the invention.

EXAMPLE

A one-inch thick strand plate with eight 0.145-inch diameter holes and four ¼-inch diameter coolant channels was adapted to a two-inch Welding Engineers extruder. Strand plate temperature was controlled with cooled heat transfer oil from one of the extruder oil heating circuits. Polymers ranging from 0.2 to 3.5 melt index were introduced into the extruder. The strand plate temperature was controlled below 300° F. and specifically in the range of 175 to 300° F. The results of the runs using both homopolymers and copolymers are set forth in Table I.

*Table I*

DIE PLATE EXTRUSION

Equipment:
    2-inch Welding Engineers Extruder
    1.900-inch diameter compound sections
    Oil cooled strand die plate (RS2-2037)
    180° (flat) strand hole inlet angle

| Feed Polymer | Lot | Melt Index | Density, gm./cc. |
|---|---|---|---|
| Polyethylene | A | 0.2 | 0.961 |
| Ethylene-Butene-1 Copolymer | B | 0.5 | 0.945 |
| Polyethylene | C | 3.6 | 0.960 |

*Table 1*—Continued

| Polymer Feed | Extrusion Conditions | | | | | | | Strand Appearance | Die Face Appearance |
|---|---|---|---|---|---|---|---|---|---|
| | Screw Speed, r.p.m. | Torque | Cyl. Temp., °F. | Gate Press, p.s.i.g. | Stock Temp., °F. | Rate, lbs./hr. | Die Plate Temp., °F. | | |
| C | 100 | 50 | 335 | 825 | 390 | 50 | 270 | Smooth | Collar formation rate slow; no apparent collar charring after 9.0 hours. |
| C | 100 | 55 | 335 | 840 | 395 | 50 | 228–268 | Smooth above 245° F. die temperature. | Collar formation rate slow above 245° F. die temperature. |
| B | 100 | 60 | 430 | 800 | 460 | 75 | 175–300 | Smooth above 250° F. die temperature. | Collar formation rate slow above 250° F. die temperature. |
| A | 100 | 50 | 430 | 1,500 | 520 | 38 | 260–295 | Smooth above 275° F. die temperature. | Collar formation rate moderate and slight charring apparent after 5.5 hrs. at 290° F. die temperature. |
| A | 100 | 65 | 430 | 1,480 | 500 | 56 | 200 | Rough | Collar formation rapid; very slight charring apparent after 11.0 hrs. |

The above data show that control of die plate temperature below 300° F., specifically in the range of 245° to 290° F. and preferably in the range of 250° to 275° F. results in (1) reduced polymer collar formation rate, (2) little or no collar discoloration during a lengthy period of operation, and (3) virtually no product contamination resulting from separation of the collars from the die plate.

While the thermoplastic material may be any fusible resin, optimum results have been achieved with homopolymers of ethylene and copolymers of ethylene with $C_3$ to $C_8$ 1-olefins and diolefins. Some examples of these are propylene, 1-butene, 1-pentene, 4-methyl-1-pentene, 1-hexene, 1-octene, 1,3-butadiene and isoprene.

As will be evident to those skilled in the art, various modifications of this invention can be made, or followed, in the light of the foregoing disclosure and discussion without departing from the spirit or scope thereof.

We claim:

Apparatus for forming a thermoplastic material into strands comprising a die having a plurality of orifices, means to supply thermoplastic to said die under pressure to force same through the orifices therein to form the material into a plurality of strands, insulating means adjacent to said die and having a plurality of openings in same of a diameter sufficient to allow the passage therethrough of said strands, a temperature control strand plate having a linear heat gradient along same communicating with said insulating means and having a plurality of conduits through same of sufficient diameter to allow passage of the strands emerging from said die, said strand plate having provided within same a plurality of conduit means to allow the circulation therethrough of a coolant, and means to introduce to and remove coolant from said strand plate.

References Cited by the Examiner
UNITED STATES PATENTS
2,436,201   2/1948   Cole _____ 264—176

ROBERT F. WHITE, *Primary Examiner.*

ALEXANDER H. BRODMERKEL, *Examiner.*